Nov. 7, 1933.　　　　S. J. POPLAWSKI　　　　1,934,445
DRINK MIXER
Filed July 25, 1931　　　　4 Sheets-Sheet 1

Inventor
S. J. Poplawski

Nov. 7, 1933.    S. J. POPLAWSKI    1,934,445
DRINK MIXER
Filed July 25, 1931    4 Sheets-Sheet 2
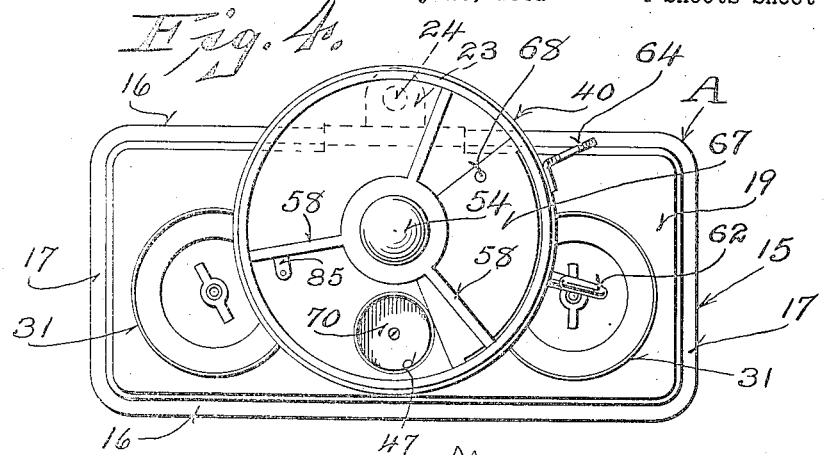
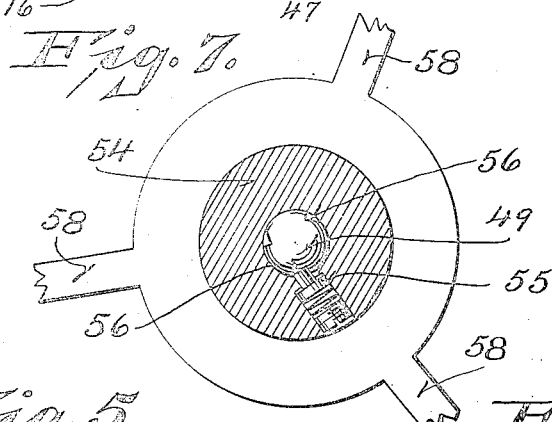
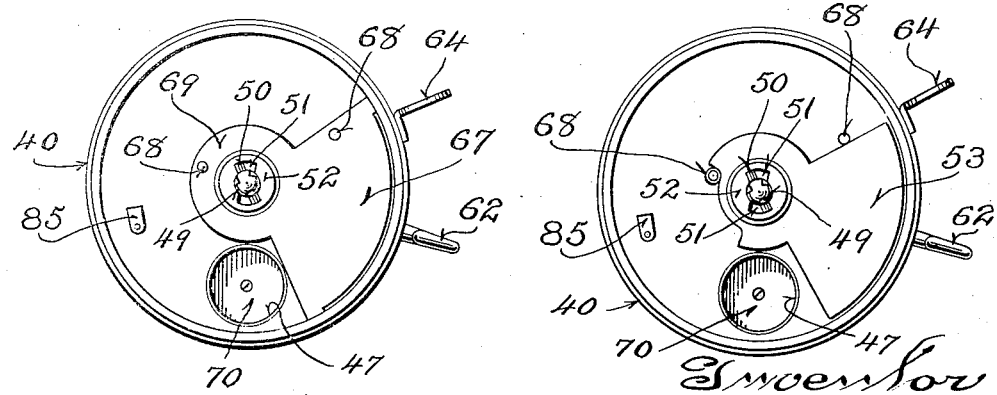
Inventor
S. J. Poplawski

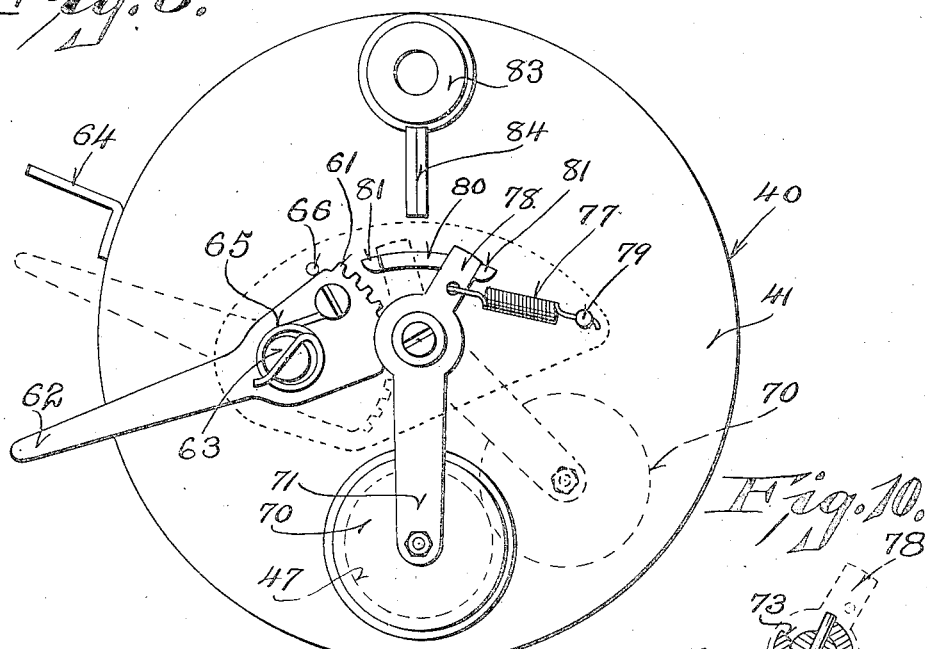
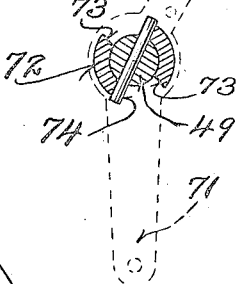
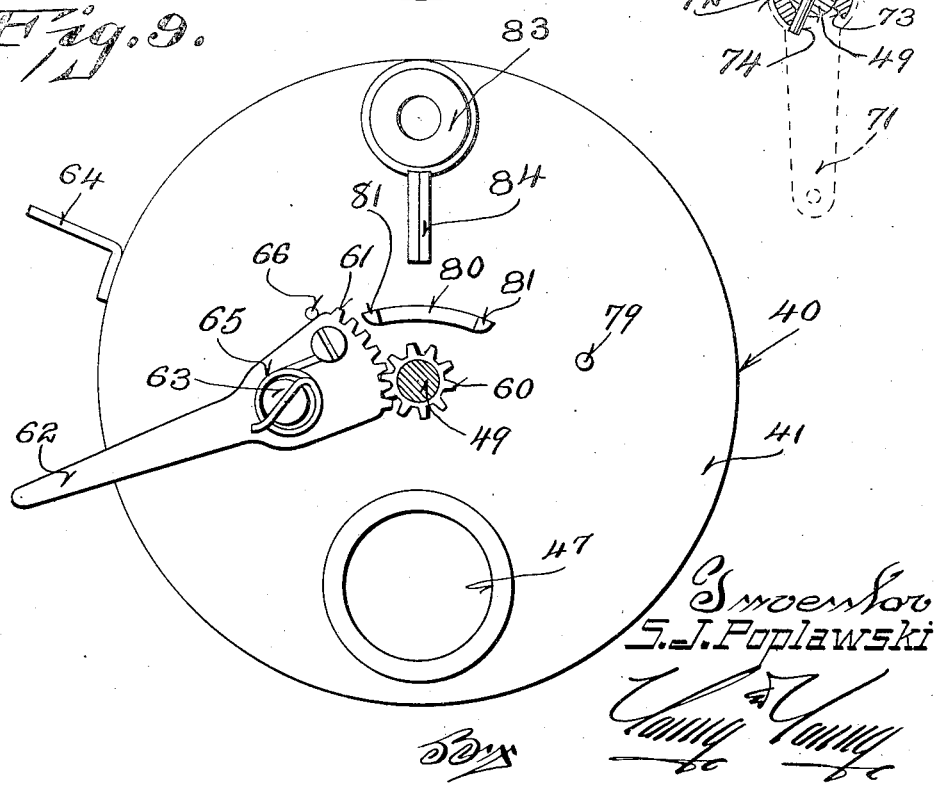

Nov. 7, 1933.                    S. J. POPLAWSKI                    1,934,445
                                    DRINK MIXER
                              Filed July 25, 1931                4 Sheets-Sheet 4
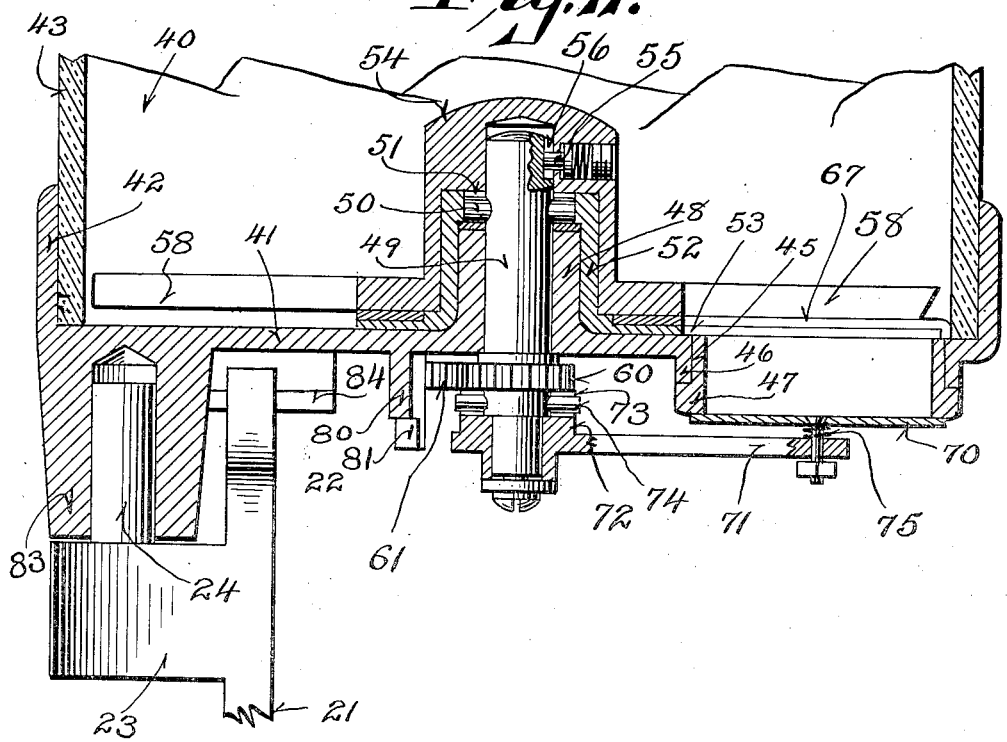
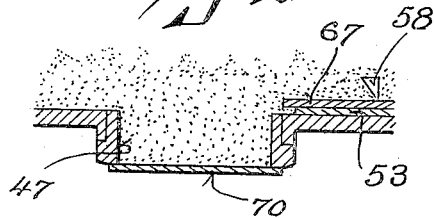
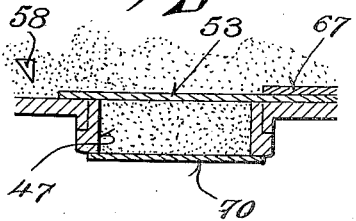
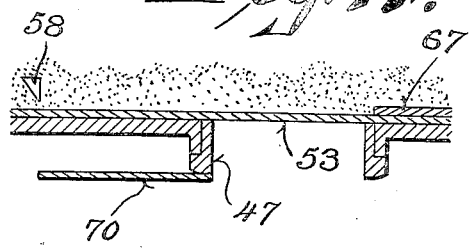
Inventor
S. J. Poplawski Patented Nov. 7, 1933

1,934,445

UNITED STATES PATENT OFFICE 1,934,445

DRINK MIXER

Stephen J. Poplawski, Racine, Wis.

Application July 25, 1931. Serial No. 553,057

23 Claims. (Cl. 225—21)

This invention appertains to the art of dispensing beverages and more particularly to a novel device for facilitating the making and the preparation of mixed drinks handled in soft drink parlors, drug stores, etc.

One of the primary objects of my invention is to provide a unitary device adapted to agitate the contents of a plurality of containers, with means for selectively dispensing material, such as malted milk to said containers.

Due to the great popularity of mixed beverages, soda fountain attendants and other dispensers of mixed beverages, are often required to mix the contents of a plurality of drink containers at one time, thus requiring a gang or plurality of agitators in order to promptly serve the trade. Also, for sanitary reasons, mechanical dispensing devices for malted milk and the like have almost universally been adopted. However, the necessity of providing individual devices of the foregoing character meets with numerous objections, due to the fact that they litter up the counter or bar, which is usually restricted in size, and the attendant is required to remove the container from the agitator, take it to the dispenser, and then return the container to the agitator, causing an appreciable loss of time and a multiplicity of operations, with the contingent cost of a plurality of individual mixing and dispensing devices.

My invention has for one of its salient objects the provision of novel means for overcoming the foregoing objections by the provision of a comparatively simple, inexpensive and neat appearing device in the form of a compact, unitary structure for selectively dispensing material to a plurality of containers and simultaneously or independently agitating the contents of said containers.

A further important object of my invention is the provision of a unitary drink mixing device in which a plurality of agitators and receptacles are mounted upon a single base, together with a dispensing device having novel means for selectively delivering material, such as malted milk to the various containers.

A further object of my invention is the provision of novel means for independently mounting the containers and motors therefor upon the base, the means being so constructed that the entire device can be readily taken apart and assembled when necessary for the making of repairs and the like.

A further important object of my invention is the provision of novel means for assuring the proper agitating of the material in the dispensing device during the serving thereof to the individual drink mixing containers, whereby the clogging and packing of the material will be prevented.

A further object of my invention is the provision of novel means for mounting the dispensing device for the material, on the base above the containers, whereby the outlet of the dispensing device can be readily swung and releasably locked above the selected container for the proper delivery of the material thereto.

A further object of my invention is the provision of novel means for insuring the proper measured amount of material to be delivered to the selected container upon each operation of the delivery valve of the dispensing device.

A still further object of my invention is to provide a device for facilitating the preparation of mixed drinks of the above character, which will be durable and efficient in use, one that will be simple and easy to manufacture and one which can be placed upon the market at a reasonable cost and which will present a pleasing and attractive appearance to the eye.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment my invention constructed according to the best mode I have so far devised for the practical application of the principles thereof, and in which:

Figure 4 is a plan view of my improved device with the dispensing receptacle removed therefrom;

Figure 5 is a top plan view of the dispenser with the receptacle and the agitator removed therefrom;

Figure 6 is a view similar to Figure 5, but showing the guide plate for the cutoff valve removed;

Figure 7 is an enlarged fragmentary horizontal section illustrating the connection between the agitator for the material to be dispensed and the actuating shaft;

Figure 8 is a bottom plan view of the dispenser;

Figure 9 is a similar view as Figure 8 with parts cut away and in section;

Figure 10 is a detailed section illustrating the connection between the dispensing valve and the actuating shaft;

Figure 11 is an enlarged fragmentary vertical section, through the dispenser illustrating its various operating parts and its connection with its base;

Figure 12, 13 and 14 are enlarged detailed sections through the dispenser illustrating the various positions of the dispensing valve and agitator.

Figure 1:
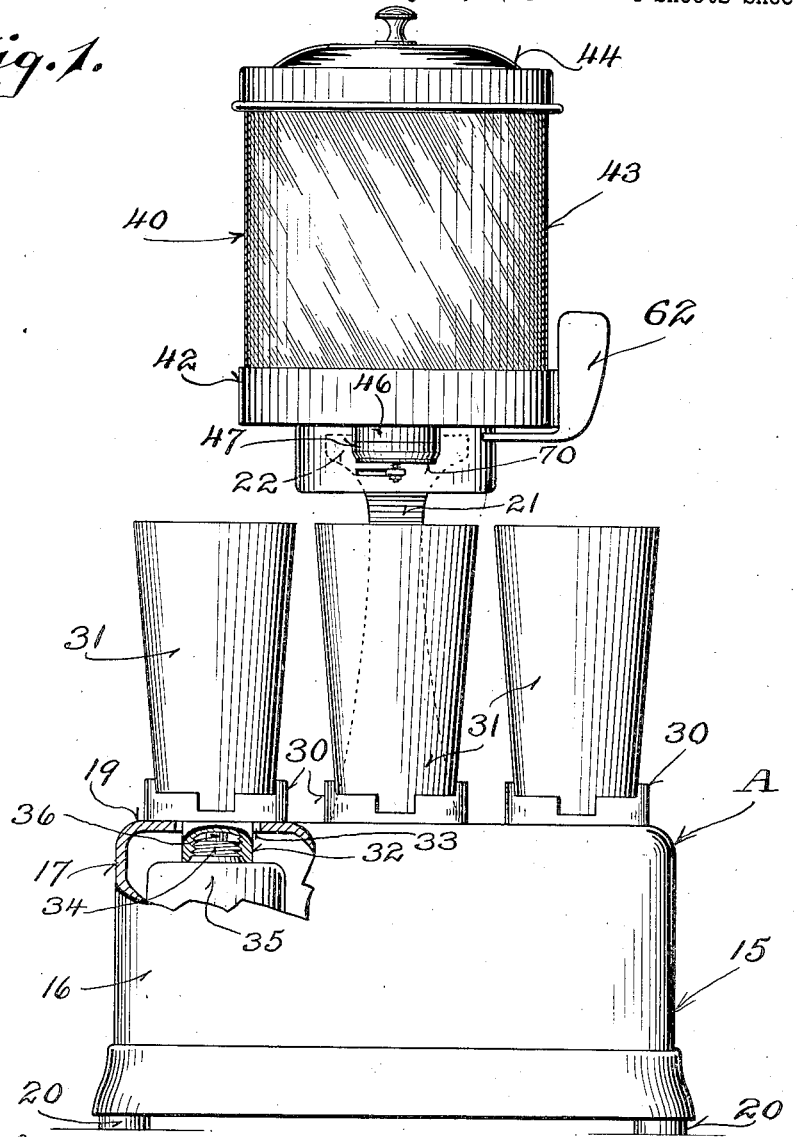
Figure 1 is a front elevation of my improved drink mixing apparatus with parts thereof broken away and in section to more clearly illustrate structural features.
Figure 2:
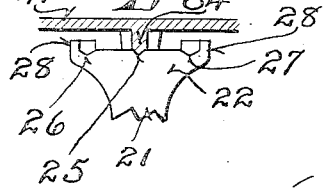
Figure 2 is a detail vertical section illustrating the connection between the dispenser and its support.

Referring to the drawings in detail, wherein similar reference characters designate corresponding parts throughout the several views, the letter "A" generally indicated my improved device which comprises a hollow base 15 preferably formed from metal suitably treated to present a pleasing and attractive appearance. This base 15 embodies front and rear walls 16, side walls 17 and a flat top wall 19. Suitable supporting pads or feet 20 are carried by the lower end of the base for resting on the soda fountain.

Extending upwardly from the rear wall of the hollow base is a supporting arm or pedestal 21 which terminates in a flared head 22. The rear face of the arm 21 directly below the head is provided with a boss 23 carrying the vertically disposed pivot pin 24.

The upper edge of the flared head 22 is provided with a centrally disposed V-shaped notch 25 and side V-shaped notches 26 and 27. At its opposite ends, the head 22 is provided with upstanding ears or projections 28 for a purpose to be later described.

The base 15 can support any preferred number of drink mixing devices and for the purpose of illustration, I have shown the base supporting three of said drink mixing devices. Each embodies a centering and supporting cup 30 for the reception of a removable drink mixing container 31, which is of the type carrying an internal propeller or agitator for mixing the drinks. Each centering and supporting cup 30 carries a depending hollow boss 32 which extends through a suitable opening 33 formed in the top wall 19 of the base. The bosses 32 are internally threaded to receive a threaded extension 34 formed on the casing of an electric drive motor 35. The armature shafts 36 of the motors extend through the boss for detachable driving connection with the agitators or propellers of the drink mixing containers.

The formation of the connection between the armature shaft of the motor and the agitator of the container may be of any preferred character or type well known in the art, or may be of the type illustrated in my co-pending application Serial No. 553,056, filed July 25, 1931.

The cups 30 are arranged in a longitudinal row on the top face of the base 15, but it is to be understood that this arrangement can be varied and the cups disposed arcuately.

Arranged above the base and supported by the pedestal 21 is the dispensing device 40. By combining the dispensing device with the base for the drink mixers, the mixing of the drinks is materially expedited.

The dispensing device 40 comprises a disc-shaped base 41 having an upstanding annular retaining flange 42 formed on its peripheral edge for the reception of the receptacle 43 which can be made of glass or other transparent material. A suitable cover 44 is provided for the top of the receptacle. The base 41 is provided with an outlet opening 45, radially disposed relative to the axis of the dispensing device. Encircling the opening 45 is a depending flange 46 and fixed in the opening is a collar or support nozzle 47 which determines the effective diameter of the outlet for the material being dispensed. It is obvious that this collar or nozzle 47 can be made in different sizes, so that varying quantities of the material may be supplied to the drink mixing devices.

Extending upwardly from the base 41 is an axially disposed hollow boss or hub 48 rotatably receiving an actuating shaft 49. This shaft extends above the boss 48 and beneath the base. At its upper end, the shaft has two diametrically opposite pins 50 which engage in slots 51 formed in the hub 52 of a cutoff top valve plate 53. The valve plate 53 is normally arranged at one side of the outlet nozzle 47, as clearly shown in Figure 12 of the drawings.

The hub 52 is of relatively large diameter and is rotatably mounted on the boss 48 of the base 41. From the description so far, it can be seen that when the actuating shaft 49 is turned a predetermined distance, the valve plate 53 will be turned therewith on the boss 48.

Rotatably mounted on the hub 52 is a cap 54 which receives the upper end of the shaft 49. This cap carries a spring-pressed pawl 55, which is normally urged toward the shaft 49. The upper end of the shaft is provided with ratchet teeth 56, as clearly shown in Figures 7 and 11 of the drawings. The cap 54 also carries a plurality of spaced radially extending agitating blades or arms 58, and these blades through the medium of the spring-pressed pawl 55 and the ratchet teeth 56 are turned in one direction only upon oscillation of the shaft.

The agitating blades 58 are substantially V-shaped in cross section as shown in Figures 12 to 14 of the drawings, with the narrow end disposed lowermost, and with the inclined leading edge facing the outlet opening. These blades are arranged in relatively close proximity to the bottom wall 41 and ride across the outlet opening 45 and function to prevent the packing of the material in the receptacle and around the outlet opening and to force the proper quantity of material into the delivery spout.

Keyed or otherwise secured to the shaft 49 below the dispensing receptacle, is a pinion 60 having meshing therewith a sector gear 61 formed on the inner edge of an operating hand lever 62. This lever is rockably mounted intermediate its ends on a suitable pin 63 carried by the bottom wall or base 41. The hand grip of the operating lever extends radially beyond the outer edge of the receptacle to enable the same to be readily grasped.

A fixed hand grip 64 is secured to the dispenser base in spaced relation to the operating lever 62 so that manual actuation of the operating lever by one hand is facilitated, the operator merely grasping both the rigid handle 64 and the operating lever 62 with one hand and exerting pressure to draw the same together. The consequent movement of the lever 62 oscillates the pinion 60 and its shaft 49. A spring 65 is employed to return the lever to its normal position, as shown in Figure 9, the spring being coiled about the pin 63, with one end thereof anchored to the pin and its other end anchored to the lever. A stop lug 65 carried by the bottom wall 41 of the dispensing device, limits the swinging of the lever in one direction.

In order to facilitate the movement of the top valve plate 53 and to prevent the packing of material on top thereof, a sector shaped guide plate 67 is provided. The plate 67 is held against turning movement in any preferred way, as by the use of pins 68, and it is to be noted that this guide plate 67 can be provided with an axially disposed substantially circular head 69 to fit over the hub 51.

Arranged below the discharge opening 47 is a bottom valve plate 70 which normally closes the opening. This valve plate 70 is carried by the outer end of a swinging arm 71 rotatably mounted on the shaft 49. The inner end of the arm 71 is provided with a hub 72 for receiving the shaft 49, and this hub is provided with suitable notches 73 for receiving radially extending pins 74 carried by the shaft 49. If desired, the bottom valve plate 70 can be loosely mounted on the end of the arm 71 so as to assure the proper engagement thereof with the lower face of the outlet nozzle 47 during swinging movement of the arm 71. A spring 75 is employed for normally urging the valve plate 70 in an upward direction toward the outlet nozzle.

It is to be noted that the notches 73 are of a greater size than the pin 74, so that during the initial rotation of the shaft 49, no movement will be imparted to the hub 72 and the arm 51, thereby allowing the top valve plate 53 to be moved over the outlet opening 45 prior to the movement of the bottom valve plate 70 away from the outlet nozzle 47.

In order to insure the proper return of the bottom valve plate 70 and its arm 71 to their normal position, after actuation, below the outlet nozzle 47, a contractile coil spring 77 is provided. As shown, one end of the contractile spring 77 is anchored to a radially extending arm 78 formed on the hub 72 of the arm 71, and the other end of the spring is anchored to a pin 79 carried by the base 41.

To insure proper swinging movement of the arm 71 and to prevent the same from moving beyond a predetermined distance, an arcuate wall 80 projects down from the lower face of the base 41 to be engaged by the arm 78. Depending lugs 81 are formed at the ends of the wall 80 to collide with and limit the movement of the arm 78.

Depending from the base 41 of the dispensing receptacle 40 diametrically opposite the outlet nozzle 47, is a hollow bearing boss 88 which rotatably receives the upstanding pin 24 carried by the stationary supporting pedestal 21. By this arrangement the dispensing receptacle projects over the hollow base 15 and over the drink mixing containers 31. The V-shaped notches 25, 26 and 27 are so spaced as to properly dispose the dispensing spout 47 over any one of the containers 31 and the lower face of the wall 41 has formed thereon, a depending rib 84 for engaging in any one of said notches.

Figure 3:
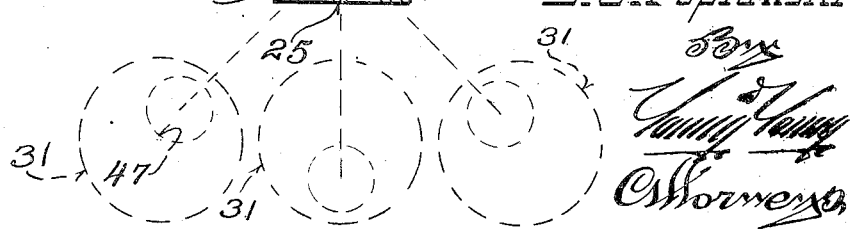
Figure 3 is a detail plan view of the support for the dispensing device including a diagrammatic showing of the relative positions of the containers and the dispenser.

By referring to Figure 3 of the drawings, it is seen that when the rib 84 rests in the notch 26, that the dispensing spout 47 will be over the left hand container 31; and that when the rib 84 is in the notch 25, that the dispensing spout will be directly over the intermediate drink mixing container and when the rib is in the notch 27, the filling spout 47 will be directly over the right hand container. The mounting of the container in this manner allows the swinging of the dispenser over any one of the receptacles, while the rib 84 and its selected groove acts to hold the dispenser in proper place against accidental movement.

In operation, the desired ingredients are placed directly in the selected container or containers, and the dispensing device is swung over the container, after which the lever 62 and the hand grip 64 is gasped by the operator and the lever swung on its pivot. This will turn the pinion 60 and the shaft 49, which will immediately rotate the material agitating arms 58, and sweep one of the same past the delivery opening to insure the disposition of the proper quantity of material in the delivery spout. After a short initial movement of the agitator arm 58 past the delivery spout, the cutoff valve plate 53 will start to move over the outlet opening, due to the engagement of the pins 50 with the walls of the notches 51.

After the cutoff valve plate rides over the outlet, as shown in Figure 13 of the drawings, the pins 74 will reach the end walls of the notches 73 which will turn the hub sleeve 72 and swing the arm 71 and the lower valve plate 70 away from the outlet nozzle 47, allowing the measured quantity of material to fall from the outlet nozzle and into the mixing container.

Upon release of the lever 62, its spring 65 and the spring 74 will function to return the lever, the shaft 49, the arms 71 and the upper and lower valve plates 53 and 70 to their normal positions. Due to the lost motion between the pins 74 and the walls of the slots or notches 73, the upper valve or cutoff plate 53 will be initially moved before the actuation of the lower valve plate. However, by the time the upper valve starts to move away from the outlet opening 45, the lower valve plate will be in its closed position.

By this arrangement, the upper valve plate 53 is normally held away from the outlet nozzle, thereby insuring the filling of the nozzle with the proper amount of the material prior to the opening of the valve plate 70.

Upon return of the shaft 49 to its normal position, the stirrers or agitator arms 58 will be held against return movement by a leaf spring 85 carried by the receptacle and disposed in the path of the arms and the pawl will merely ratchet over the ratchet teeth 56 formed on said shaft 49.

The receptacle 40 for the material to be dispensed can be readily lifted off of its supporting pin 24, whereby the said receptacle can be taken to the rear of a store for refilling. If desired, a number of different receptacles can be utilized for each machine, so that as one receptacle becomes empty, it will be merely necessary to remove the same and place a filled receptacle in position on the machine.

In the ordinary process now followed in mixing drinks, the malted milk or other granular material is placed in the containers prior to the placing of the container on the mixing machine. Thus, at the start of the mixing operation, the malted milk is thrown outwardly by centrifugal action and clings to the side of the container and is not thoroughly mixed with the drink.

With this invention, as soon as the containers are placed on the base 16, the contents of the containers are set in motion after which the malted milk can be dispensed thereto. As the malted milk is dispensed approximately into the center of the drink, it will be drawn down into the vortex and thus will be thoroughly mixed with the other ingredients.

Changes in details may be made without departing from the spirit or the scope of this invention, but what I claim as new is:

1. A combined drink mixing and dispensing device comprising a common base, a plurality of agitating containers mounted on said base and a shiftable dispenser mounted on the said base for selectively delivering material to said containers.

2. A combined drink mixing and dispensing device comprising a base, a plurality of agitating containers mounted on said base, and a shiftable container mounted above said containers for delivering material to any one of the said containers.

3. A combined drink mixing and dispensing device comprising a base, a plurality of agitating containers mounted on said base, and a shiftable dispenser rotatably and detachably mounted on the base above said containers for selectively delivering material to any one of said containers.

4. A combined drink mixing and dispensing device comprising a common base, a plurality of agitating containers mounted on the base, a dispenser rotatably mounted on the base above the containers for selectively delivering material to any one of said containers while the same are in operation, and means for detachably holding the dispenser in a selected position above the desired container.

5. A unitary device for agitating mixed drinks and for dispensing material thereto comprising a common base, a plurality of agitating containers mounted on said base, a supporting arm carried by the base provided with a bearing pin and a head provided with a series of spaced notches, a dispenser having a bearing boss rotatably mounted on the pin for swinging movement over any selected container, and a lock rib on the receptacle for selectively fitting in any one of said notches.

6. A combined drink mixing and material dispensing device, a base, a plurality of agitating containers mounted upon the base, a material dispenser movably mounted on the base above the containers to be selectively positioned above any one of said containers, and means for latching the dispensing container in any one of said positions.

7. In a combined drink mixing and material dispensing device, a base, a plurality of agitating containers mounted upon the base, a material dispenser rotatably mounted on the base, means carried by the dispenser for discharging a measured quantity of material therefrom, and means for shifting the material dispenser over any selected agitating container so that material discharged therefrom falls by gravity into the selected containers.

8. In a device of the class described, a material dispensing device comprising a vessel having an outlet nozzle, a rotatable operating shaft, means for actuating the shaft, a guard plate arranged at one side of the nozzle and in slightly spaced relation to the bottom wall of the receptacle, a cutoff valve plate normally disposed at one side of the nozzle and under the guard plate, means for operating the cut-off valve plate from the shaft, and an arm rotatably mounted on the shaft, a bottom valve plate normally held against the nozzle carried by the arm, the arm having enlarged notches therein, pins carried by the shaft and received within said notches, the notches being of greater width than the diameter of the pins, whereby the cutoff valve plate will be actuated prior to the arm.

9. In a device of the class described, a material dispensing device comprising a vessel having an outlet nozzle, a rotatable operating shaft, means for actuating the shaft, a guard plate arranged at one side of the nozzle and in slightly spaced relation to the bottom wall of the receptacle, a cutoff valve plate normally disposed at one side of the nozzle and under the guard plate, means for operating the cutoff valve plate from the shaft, an arm rotatably mounted on the shaft, a bottom valve plate normally held against the nozzle carried by the arm, the arm having enlarged notches therein, pins carried by the shaft and received within said notches, the notches being of greater width than the diameter of the pins, whereby the cutoff valve plate will be actuated prior to the arm, and means for agitating the material in the vessel adjacent to the nozzle including a hub sleeve having radially extending arms, ratchet teeth formed in the shaft, and a spring-pressed pawl carried by the hub sleeve for engaging the ratchet teeth for rotating the hub sleeve and its agitating arms in one direction upon rotation of the shaft.

10. In a dispensing device, a dispensing receptacle comprising a bottom wall having an outlet, a rotatable shaft, an upper valve plate movable over the top of the outlet opening, a bottom valve plate movable over the bottom of the outlet opening, means for agitating material in the receptacle, means for operating the top and bottom valve plates and the agitating means from the shaft, a pinion on said shaft, a swinging lever rockably mounted intermediate its ends upon the lower face of the receptacle and having a sector gear meshing with the pinion, spring means normally holding the operating lever in one position, and a rigid hand grip carried by the receptacle arranged in spaced relation to the lever.

11. A combined drink mixing and dispensing device comprising, a base, means on said base to mount a container having agitating means therein, drive means carried by the base for actuating said agitator, a receptacle to hold an ingredient of the drink to be mixed, means on the base to mount the receptacle above the container, and means to dispense a quantity of the contents of the receptacle directly into the container.

12. In a combined drink mixing and dispensing device, a base, a plurality of means on the base to mount a plurality of mixing containers, each container having an agitator therein, drive means carried by the base to actuate said agitators, a receptacle to hold an ingredient of the drink to be mixed, means to dispense a quantity of the contents of said receptacle, and means carried by the base to mount the dispenser for selective movement over any one of the containers so that material dispensed therefrom falls directly into such container.

13. In a combined drink mixing and dispensing device, a base, means on the base to grip and securely hold a container for the drink to be mixed, said container having agitating means therein, drive means carried by the base to actuate said agitator, a pedestal extending upwardly from the base, a dispensing receptacle mounted on said pedestal to overhang the top of the container, and means to dispense the contents of said receptacle directly into the container.

14. In combination, a base, a plurality of centering and supporting members on the base each adapted to mount a mixing container, a pedestal projecting upwardly from the base, a dispensing receptacle adapted to contain an ingredient of the drink to be mixed, means to dispense a measured quantity of said ingredient from the receptacle, and means to mount the receptacle from the pedestal for swinging movement selectively over the open top of any one of said mixing containers.

15. In combination, a base, a plurality of centering and supporting members on the base each adapted to mount a mixing container, having an agitator therein, drive means disposed within the base and associated with said centering and supporting members to actuate the agitators of the mixing containers mounted thereon, a pedestal projecting upwardly from the base, a receptacle adapted to contain one of the ingredients of a drink to be mixed, means to dispense a measured quantity of the contents of the receptacle, and means to mount the receptacle from the pedestal for selective movement over any one of said mixing containers.

16. In a combined drink mixing and dispensing device including a mixing container having an agitator therein, drive means for the agitator, a receptacle to hold an ingredient of the drink to be mixed and having means to discharge a measured quantity of its contents, and a common base to mount the mixing container and drive means in operative relationship with the receptacle above the container so as to discharge its contents into the top of the container.

17. In a combined drink mixing and dispensing device including a plurality of mixing containers, a receptacle to hold an ingredient of the drink to be mixed and having a controllable discharge opening, and a common base to mount all of the mixing containers and the receptacle, with the receptacle movable to selectively position its discharge opening over any one of said containers.

18. In a device of the character described, a hollow base, means on the top of the hollow base to center and support a mixing container having an agitator therein, a drive motor disposed within the hollow base and having a drive shaft projecting up through the centering and supporting means to be drivingly connectible with the agitator in the container, a rigid pedestal mounted on the base and extending upwardly therefrom alongside the container, and a dispensing receptacle mounted from said pedestal and provided with means to discharge a measured quantity of its contents directly into the open top of the container while the contents of the container are being agitated.

19. In a device of the character described, a receptacle having a discharge opening in the bottom wall thereof through which the contents of the receptacle may be dispensed, a valve member movable over the top of the discharge opening and normally in an open position at one side of the discharge opening, a valve member normally closing the bottom of the discharge opening and movable to an open position, the space between said upper and lower valve members defining a measuring compartment, an agitator disposed within the receptacle and movable across the open top of the discharge opening to insure the filling of said measuring compartment, and means to successively actuate the agitator and the valves so that the agitator moves across the open discharge opening in advance of the upper valve member and whereby said upper valve member closes completely before the lower valve member moves to open position.

20. In a device of the character described, a dispensing receptacle having a discharge opening in its bottom wall, a rotatable shaft journalled in said bottom wall, an upper valve member mounted to turn about the axis of said shaft and to move over the open top of the discharge opening, a lower valve member mounted to turn about the axis of said shaft and normally in a position closing the bottom of the discharge opening, driving connections between said shaft and the valves, one of said driving connections having a degree of lost motion, whereby upon turning of the shaft, the valves are successively actuated, and means to turn said shaft.

21. In a device of the character described, a dispensing receptacle having a discharge opening through which the contents of the receptacle may be dispensed, a shaft journalled alongside said opening, an upper valve mounted to turn about the axis of said shaft and movable over the top of the discharge opening to close the same, a lower valve mounted to turn about the axis of the shaft and normally closing the bottom of the discharge opening, the space formed by the discharge opening between the valves defining a measuring compartment, an agitator mounted to turn about the axis of the shaft to insure the filling of said measuring compartment, ratchet means drivingly connecting the agitator to the shaft whereby the agitator is turned in one direction upon oscillation of the shaft, driving connections between the shaft and the valves, the driving connection between the shaft and the lower valve embodying a degree of lost motion, whereby upon turning of the shaft, the upper valve is actuated to closed position before the lower valve is moved out of closed position, and means to turn the shaft.

22. In a device of the character described, a dispensing receptacle having a discharge opening through which the contents of the receptacle may be dispensed, a shaft journalled alongside said opening, an upper valve mounted to turn about the axis of said shaft and movable over the top of the discharge opening to close the same, a lower valve mounted to turn about the axis of the shaft and normally closing the bottom of the discharge opening, the space formed by the discharge opening between the valves defining a measuring compartment, an agitator mounted to turn about the axis of the shaft to insure the filling of said measuring compartment, ratchet means drivingly connecting the agitator to the shaft whereby the agitator is turned in one direction upon oscillation of the shaft, driving connections between the shaft and the valves, the driving connections between the shaft and said valves having different degrees of lost motion, whereby upon turning of the shaft the movement of the upper valve lags behind the movement of the agitator, and the movement of the lower valve lags behind the actuation of the upper valve, and means to turn the shaft.

23. In a device of the character described, a dispensing receptacle having a discharge opening in its bottom wall, a bored hub projecting upwardly from said bottom wall alongside the discharge opening, a shaft journalled in the bore of the hub, an upper valve journalled on said hub and movable across the open top of the discharge opening, a lower valve mounted on said shaft, said lower valve normally closing the bottom of the discharge opening and being movable about the axis of the shaft to an open position, driving connections between the shaft and said valves, the driving connection between the shaft and the lower valve embodying a degree of lost motion, whereby upon rotation of the shaft the upper valve is actuated prior to the actuation of the lower valve, and means to turn said shaft.

STEPHEN J. POPLAWSKI.